United States Patent [19]

Danner et al.

[11] Patent Number: 5,258,876
[45] Date of Patent: Nov. 2, 1993

[54] ZONE BIT RECORDING WITH WRITE COMPENSATION

[75] Inventors: Gina R. Danner, Inver Grove Heights; Evgeny J. Berzon, Minneapolis, both of Minn.

[73] Assignee: Seagate Technology, Inc., Scotts Valley, Calif.

[21] Appl. No.: 760,105

[22] Filed: Sep. 16, 1991

[51] Int. Cl.⁵ ............................................. G11B 5/09
[52] U.S. Cl. ......................................... 360/45; 360/46
[58] Field of Search ........................ 360/45, 46, 51, 31

[56] References Cited

U.S. PATENT DOCUMENTS

| | | |
|---|---|---|
| 4,079,942 | 3/1978 | Kunen . |
| 4,190,860 | 2/1980 | Somers et al. . |
| 4,220,922 | 9/1980 | Ikeguchi . |
| 4,314,287 | 2/1982 | Freeman et al. . |
| 4,338,683 | 7/1982 | Furukawa et al. . |
| 4,348,699 | 9/1982 | Tsuchiya et al. . |
| 4,351,044 | 9/1982 | Imanaka et al. . |
| 4,357,635 | 11/1982 | Hasegawa . |
| 4,388,713 | 6/1983 | Tatsuguchi . |
| 4,422,110 | 12/1983 | Reynolds . |
| 4,492,992 | 1/1985 | Rooney et al. . |
| 4,514,771 | 4/1985 | Stark et al. . |
| 4,530,018 | 7/1985 | Hoshino et al. . |
| 4,539,667 | 9/1985 | Fujiie . |
| 4,546,461 | 10/1985 | Isobe . |
| 4,799,112 | 1/1989 | Bremmer et al. ............... 360/51 |
| 5,087,992 | 2/1992 | Dahandeh et al. ............... 360/31 |

Primary Examiner—Vincent P. Canney
Attorney, Agent, or Firm—Kinney & Lange

[57] ABSTRACT

A data storage system has a rotatable magnetic disc with a plurality of concentric tracks. The system also has read/write circuitry for writing data to the tracks and reading data from the tracks at various frequencies and for pre-compensating the data written to the tracks to compensate for intersymbol interference. Frequency zones are established for the tracks by preliminarily assigning each track to one of a plurality of frequency zones. The pre-compensation is adjusted based on the intersymbol interference which occurs using the preliminary assignment of the tracks to the frequency zones. Data is then written to the tracks and the window margins for the data are tested to see if they meet a threshold window margin. If the window margins do not meet the threshold window margin, the assignment of the tracks to the frequency zones is adjusted and the pre-compensation is also adjusted.

19 Claims, 7 Drawing Sheets

ZONE BIT RECORDING WITH WRITE COMPENSATION

INCORPORATION BY REFERENCE

The following patents are hereby fully incorporated by reference: U.S. Pat. No. 4,799,112 issued Jan. 17, 1989 to Bremmer et al and Garde U.S., entitled METHOD AND APPARATUS FOR RECORDING DATA and assigned to Magnetic Peripherals Inc.; and patent application Ser. No. 440,662 filed Nov. 22, 1989 entitled METHOD AND APPARATUS FOR MEASURING BIT SHIFT, assigned to the same assignee as the present application and allowed on Jan. 24, 1991, and for which the issue fee has been paid.

BACKGROUND OF THE INVENTION

The present invention deals with data storage in a magnetic disc data storage system. More particularly, the present invention relates to zone bit recording in a data storage system with write compensation.

A magnetic disc, such as one used in a computer disc drive, is a flat circular platter with a magnetic surface. Data is stored on the magnetic surface by selective polarization of portions of the magnetic surface. The presence or absence of polarity transitions between the polarized portions represents particular binary values. Typically, the magnetically polarized portions are arranged in a plurality of radially concentric tracks on the magnetic surface to aid in location and read back of the data.

In order to read back the data recorded on the magnetic surface, a magnetic transducer supported by a read/write head assembly moves relative to the magnetic disc along a given track. The magnetic transducer generates an electrical signal (the "read signal"), which represents the states of polarization encountered along the track. Pulses in the read signal correspond to the magnetically polarized portions of the magnetic disc.

During processing of the read signal, the processing logic (i.e., the read chain logic) is configured to recover data from the read signal during a certain period in time known as a read window The read window represents the time during which the pulses in the read signal, which represent digital data stored on the magnetic disc, are valid. However, the actual window during which the pulses are valid can shift in time due to a variety of reasons including intersymbol interference (or "pulse crowding"). In other words, where pulses are written too close to one another on the magnetic disc, they interfere destructively causing the peaks in the read signal to shift in time relative to the read window. Where large intersymbol interference is encountered, the peaks can shift outside the read window causing erroneous data to be read back from the magnetic disc.

In order to overcome the peak shifts caused by intersymbol interference, many disc drive data storage systems are provided with a feature known as precompensation or write compensation. In such systems, the data pulses to be written to the magnetic disc are shifted in time, prior to being written, by an amount calculated to offset the peak shift due to intersymbol interference. The amount of pre-compensation needed can be measured and implemented in a variety of known manners.

Notwithstanding the fact that intersymbol interference is a problem in disc drive systems, it is desirable to maximize the amount of data that can be stored on a disc in order to save space and reduce the number of discs needed to store a particular amount of data. The outer tracks on a magnetic disc are longer than the inner tracks Thus, data stored on a magnetic disc at constant frequency using constant angular velocity results in a significant decrease in data density on the outer tracks Consequently, storage space is wasted on all but the innermost track when using a fixed frequency, fixed angular velocity method of data storage.

As discussed in the Bremmer et al U.S. Pat. No. 4,799,112, the amount of data stored by a magnetic data storage system can be increased by grouping the tracks on the magnetic discs into frequency zones. All the tracks in each zone are written at a given zone frequency assigned to the particular zone in which the track is located The frequency at which data is written differs from zone to zone along the surface of the disc. Bremmer et al disclose a circuit for implementing such an approach to data storage optimization. Bremmer et al further disclose a method for selecting the zone frequencies and track-to-zone assignments in a way that results in a substantially constant error rate in the writing of data to, and the subsequent reading of data from all the tracks on the magnetic disc.

In the implementation taught by Bremmer et al, an error rate for each track at each of the selected zone frequencies is determined by measuring a magnetic characteristic of the disc. In particular, Bremmer et al measure the shape of an electrical pulse produced by the read/write head as the head passes a single magnetic reversal on the disc surface. Bremmer et al use a mathematical model to determine the resolution of a series of such pulses The error rate, associated with the calculated resolution, is controlled by assigning tracks to frequency zones for which the calculated resolution meets a selected threshold value.

While Bremmer et al teach an effective way of increasing data storage on magnetic discs, they do not implement the technique of providing write compensation to accommodate for intersymbol interference.

REFERENCE TO CO-PENDING APPLICATION

Reference is hereby made to a co-pending U.S. patent application Ser. No. 359,740, filed May 31, 1989, entitled METHOD FOR ASSIGNING TRACKS ON A MAGNETIC DATA STORAGE DISC TO DIFFERENT READ/WRITE FREQUENCY ZONES. The patent application was filed by Dahandeh et al and is assigned to the same assignee as the present application.

The Dahandeh et al application, like Bremmer et al, also provides a method for assigning tracks to zones using an approach applicable to substantially any magnetic disc data storage system. Tracks of a magnetic disc are assigned to the zones as taught by the Bremmer et al patent application, but without the use of a mathematical model. Rather, an error indication parameter is measured directly by writing a plurality of known data bit groups on selected tracks of the disc at selected zone frequencies. Subsequently, the data bit groups are read and compared with the data bit groups as written. Based on the comparison, an error indication parameter is generated for each of the selected tracks at each of the selected write frequencies. The error indication parameter provides a direct measure of the error rate for the selected tracks at the selected frequencies.

Track assignments are then made by assigning each track, on the basis of the measured error indication parameters, to the highest frequency zone for which the value of the error indication parameter does not exceed a preselected threshold value.

While the method taught in the Dahandeh et al application teaches an effective way of optimizing data storage on a magnetic disc, it does not teach how to use such a method in a magnetic data storage system which utilizes write compensation to overcome the peak shifts caused by intersymbol interference.

SUMMARY OF THE INVENTION

A data storage system has a rotatable magnetic disc with a plurality of concentric tracks on the disc. The system also has means for writing data to the tracks and reading data from the tracks at various frequencies. The means for writing data includes means for precompensating the data written to the tracks to compensate for intersymbol interference. Frequency zones are established for the tracks by preliminarily assigning each track to one of a plurality of frequency zones wherein each of the frequency zones corresponds to a zone frequency at which data is written to the tracks and read from the tracks. The pre-compensation to the data is adjusted and optimized after the preliminary assignment of tracks to the frequency zones. Data is then written to the tracks and the window margins for the data written are checked to see that they meet a threshold window margin. If the window margins do not meet the threshold window margin, the assignment of the tracks to the frequency zones is adjusted and the precompensation is reoptimized for the new frequency.

DETAILED DESCRIPTION OF THE PREFERRED EMBODIMENTS

I. Introduction—Disc Formatting

Figure 1A:
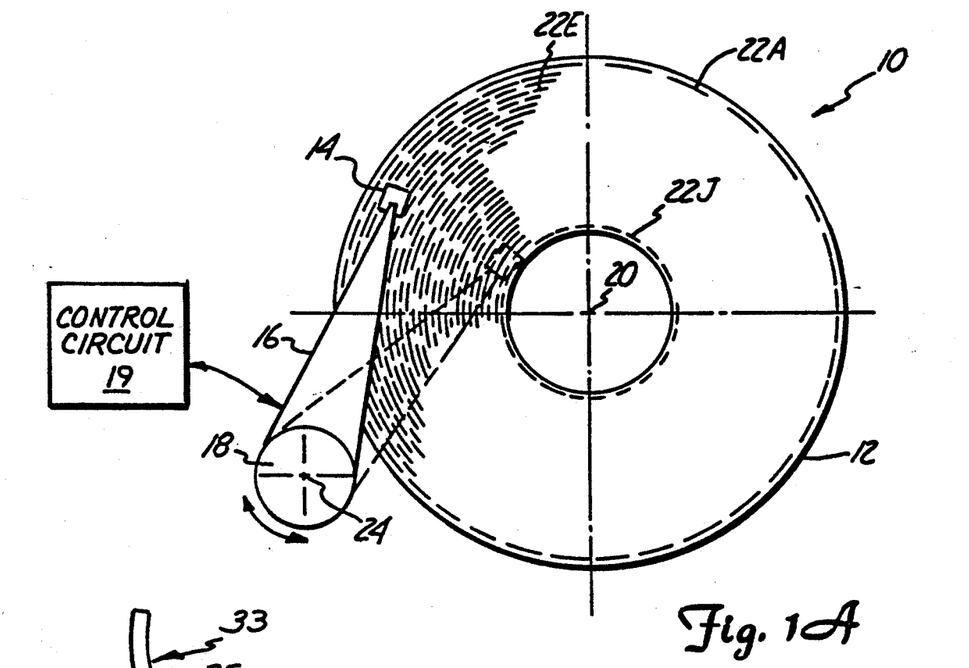
FIG. 1A is a plan view of a portion of a conventional disc drive.

FIG. 1A illustrates a portion of a magnetic disc drive 10. Disc drive 10 includes magnetic disc 12, slider 14, actuator arm 16, rotary actuator 18 and control circuit 19 Although disc drive 10 is shown with only a single magnetic disc 12, it will be understood by those skilled in the art that the present invention is applicable to disc drives including a plurality of magnetic discs.

Magnetic disc 12 is mounted for rotation on a spindle centered on axis 20. Information blocks are arranged on magnetic disc 12 in a plurality of radially concentric tracks 22A-22J. Although there are typically many more data tracks on a magnetic disc than those shown in FIG. 1A, for simplicity's sake, only a limited number of tracks are illustrated. Data tracks 22A and 22J are the outermost and innermost data tracks, respectively, on magnetic disc 12.

Figures 1B, 1C:
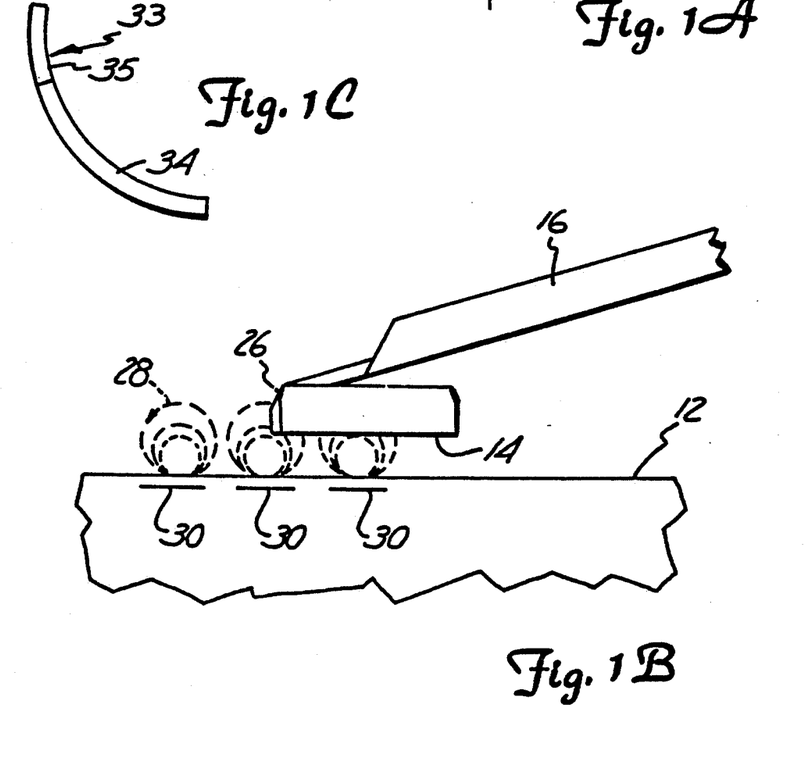
FIG. 1B is a partial cross-sectional view of the conventional disc drive shown in FIG. 1A.
FIG. 1C illustrates a sector of the disc drive of FIGS. 1A and 1B.

Slider 14 carries a magnetic transducer (transducer 26 shown in FIG. 1B). The slider 14 and transducer 26 are collectively referred to as a read/write head. As magnetic disc 12 rotates, slider 14 flies just over the surface of magnetic disc 12. Slider 14 is attached to actuator arm 16 which is, in turn, attached to rotary actuator 18. Actuator arm 16 is mounted for rotation about axis 24 of rotary actuator 18. As slider 14 flies above the surface of magnetic disc 12, control circuit 19 controls rotary actuator 20 to position slider actuator 14 over a selected track, for example, track 22E.

FIG. 1B shows a portion of a sectional view of disc drive 10. Magnetic transducer 26 is mounted on a face of slider 14 which is perpendicular to the surface of magnetic disc 12. As transducer 26 flies over magnetic disc 12, transducer 26 senses magnetic flux lines 28 emitted from polarized portions 30 of magnetic disc 12. Magnetic transducer 26 generates a read signal which is characterized by positive going or negative going transitions in pulses associated with the flux reversals of flux lines 28 emitted by polarized portions 30. The read signal is demodulated and data is recovered from the read signal.

Typically, as shown in FIG. 1C, each track on disc 12 is divided into a plurality of sectors 33 that are comprised of a data block 34 and a control block 35 The data block 34 is used to store data in the form of a series of flux reversals and the control block 35 is used to store a string of control bits in a similar manner. In addition, an initialization block can be included in the sector 33 to indicate the first sector on the track to assist in the location of data on the track.

The lengths of the data blocks 34 are selected based on the rotation rate of the disc 12 and the frequency at which data is written to the disc The length of the data blocks 34 are also selected to accommodate groups of data bits organized into a preselected number of bytes selected by the user. The number of bytes is generally a power of two with 512 bytes and 1024 bytes being commonly used examples.

The control block 35 generally contains a series of bits that perform control functions For example, a control block 35 can include control bits utilized in checking the written data bits in data block 34 for errors. In particular, and as is generally known in the art, a check character can be generated during writing of the data bit group in the data block 34 and stored in the control block 35 following the data block 34. The check character is regenerated during readback of the data bit group for comparison with the stored check character. Differences between the stored and regenerated check characters provide a means for checking for errors in the transcription and reading of data.

II. The Hardware

A. Block Diagram

Figure 2:
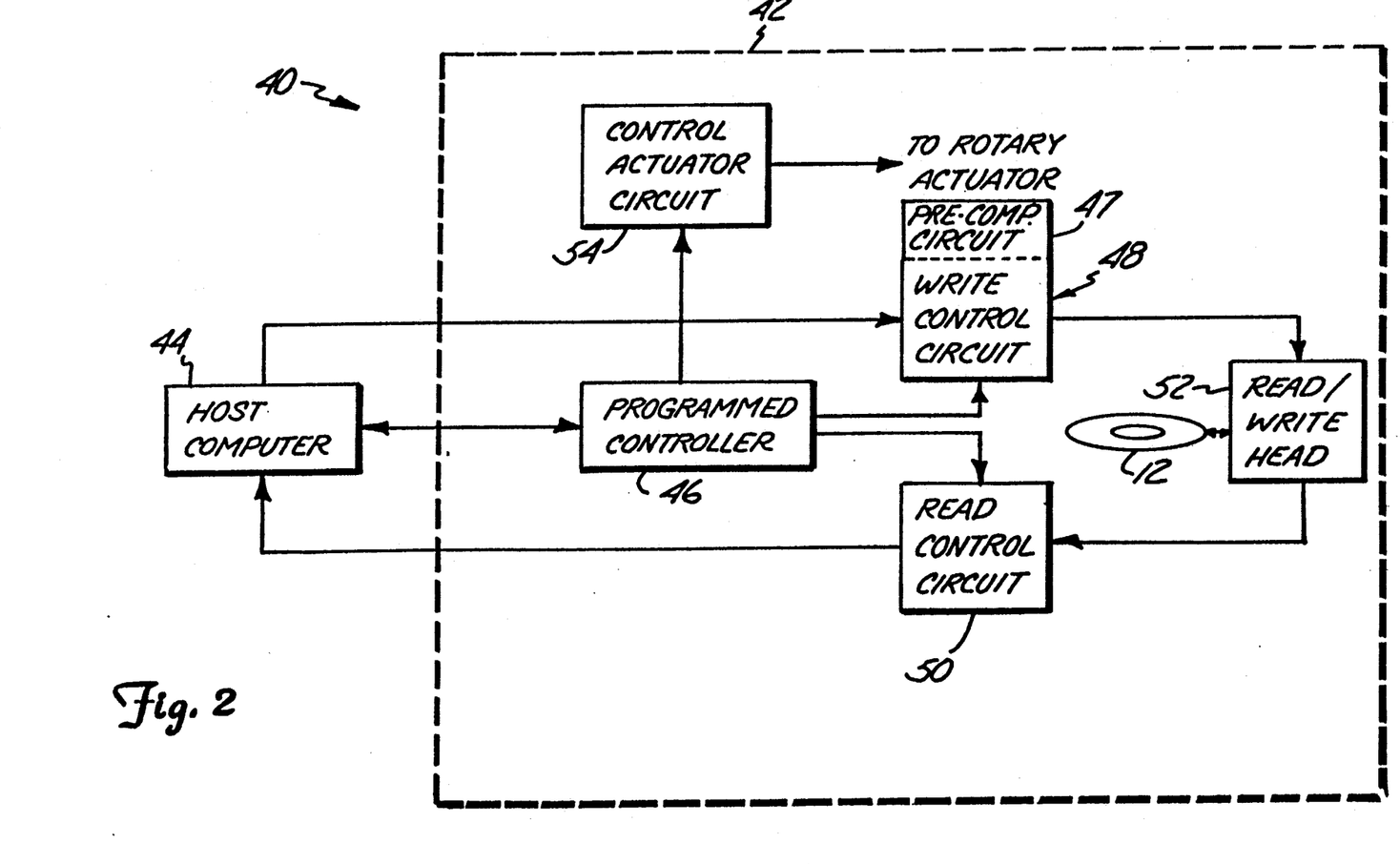
FIG. 2 is a block diagram of a disc drive coupled to a host computer.

FIG. 2 is a block diagram of a control system 40 used in accordance with the present invention. Control system 40 includes disc drive 42 and host computer 44. Disc drive 42 includes disc 12, programmed controller 46, write control circuit 48 (which includes pre-compensation circuit 47), read control circuit 50, read/write head 52 and actuator control circuit 54. System 40 can be any magnetic disc data storage system, cooperable with the host computer 44, to store data at a selectable write frequency. Read/write head 52 typically includes a slider, such as slider 14, and a transducer, such as transducer 26.

Programmed controller 46 controls actuator control 54 to position read/write head 52 over a desired track on magnetic storage disc 12. Host computer 44 then provides write data (data to be written to magnetic disc 12 in disc drive 42) to programmed controller 46. Programmed controller 46, in turn, controls write circuit 48 to provide a controlled write current to read/write head 52. Read/write head 52 selectively magnetizes portions of the magnetic storage disc 12 in a pattern representative of the write data provided by host computer 44.

In order to read data from the disc, programmed controller 46 receives instructions from host computer 44 indicating the location on the magnetic disc 12 of data to be read. Programmed controller 46, in turn, controls actuator control circuit 54 to position read/write head 52 over the desired track on the magnetic storage disc 12 Read/write head 52 generates a read signal representative of data stored on the track over which it is traveling Programmed controller 46 then controls read control circuit 50 to recover data from the read signal generated. The data is recovered in the form of digitized pulses representative of the data.

B. Peak Shifts and Pre-Compensation

Figure 3:
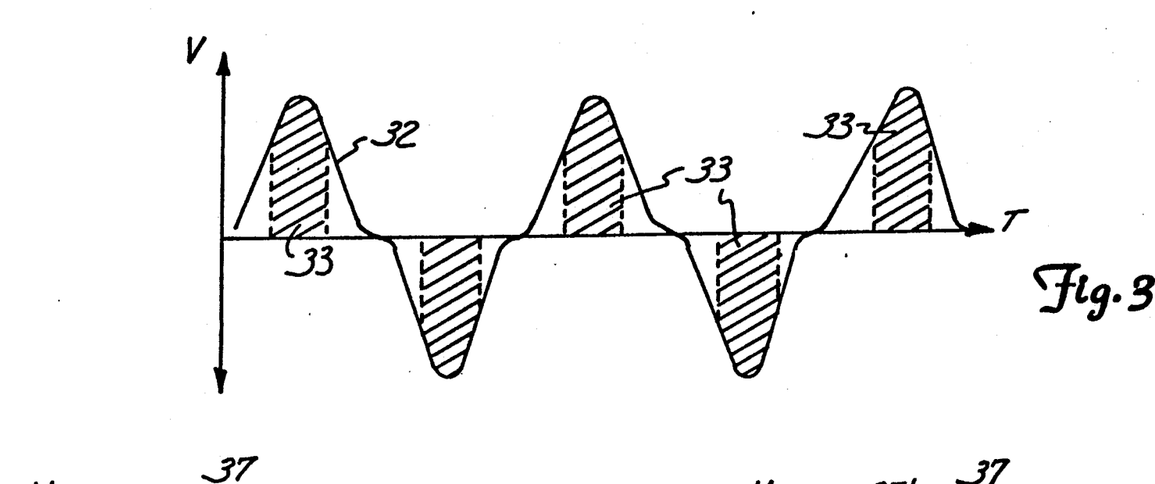
FIG. 3 is a waveform corresponding to a read signal.

FIG. 3 shows a waveform 32 which is representative of a typical read signal The pulses in waveform 32 are generated by read/write head 52 in response to flux reversals which are representative of the information stored in digital form on the magnetic storage disc. The cross-hatched areas 33 represent read windows during which the pulses in read signal 32 are valid. Thus, the peaks in the pulses in read signal 32 would be optimally centered within the read windows.

Figure 4A:
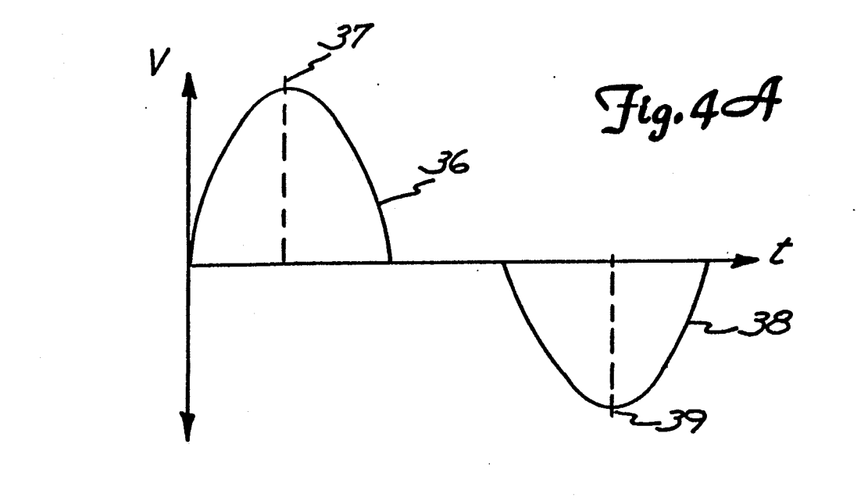
FIG. 4A shows two isolated data pulses.

FIG. 4A shows two isolated pulses representative of two isolated bits 36 and 38 recorded on a magnetic storage disc. By "isolated", it is meant that the bits are recorded at a distance spaced far enough from one another that they do not interfere. Thus, the pulses 36 and 38 have their peaks 37 and 39 in an unshifted time period substantially centered in the read windows.

Figure 4B:
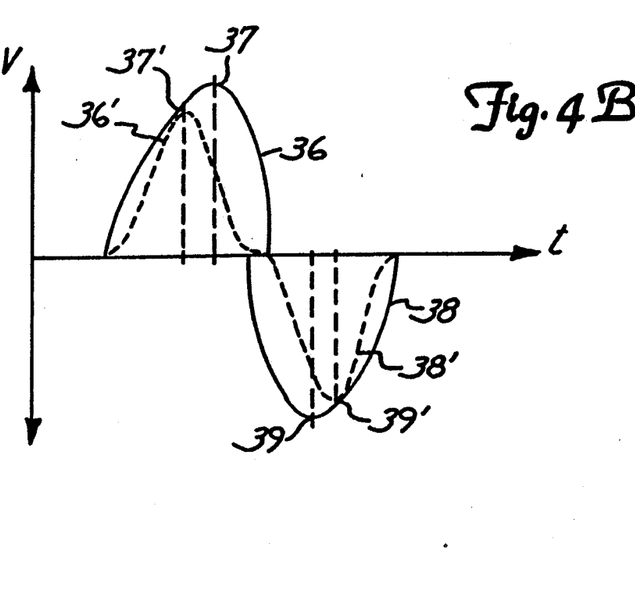
FIG. 4B shows two data pulses with peak shifts caused by intersymbol interference.

FIG. 4B shows a waveform which illustrates the effects of intersymbol interference or pulse crowding. In FIG. 4B, pulses 36 and 38 are recorded in close proximity to one another along the magnetic storage disc. Therefore, they interfere destructively with one another to result in pulses 36' and 38' shown in dashed form. The effect is a shift in the peaks 37 and 39 away from one another in time. This is illustrated by peaks 37' and 39'. As is generally known in the art, when the peak shift becomes large enough to move the peaks 37' and 39' of the data pulses 36' and 38' outside the read windows 33, erroneous data will be read from the magnetic storage disc.

Therefore, pre-compensation or write compensation is used to offset the peak shift When reading data back from the magnetic disc 12, programmed controller 46, in cooperation with read control circuit 50, measures peak shift in the data written to the disc which is caused by intersymbol interference. Programmed controller 46 then controls, a pre-compensation circuit 47 in write control circuit 48 to pre-compensate the data written to the magnetic disc to accommodate for the peak shift. In other words, programmed controller 46 causes pre-compensation circuit 47 in write control circuit 48 to shift the write data pulses in time by an amount equal to the peak shift caused by intersymbol interference. Thus, the peak shift caused by the intersymbol interference on the magnetic storage disc causes the peaks to shift back into the center of the read window when the data is read back.

The write compensation and measurement of peak shift can be accomplished in any one of a variety of known manners. For example, the peak shift can be measured using the method described in the Garde U.S. patent application Ser. No. 440,662. Pre-compensation circuit 47 is preferably a delay line used to shift data by a variable time period based on the peak shift measured.

III. Operation

A. Overall Operation

Figure 5A:
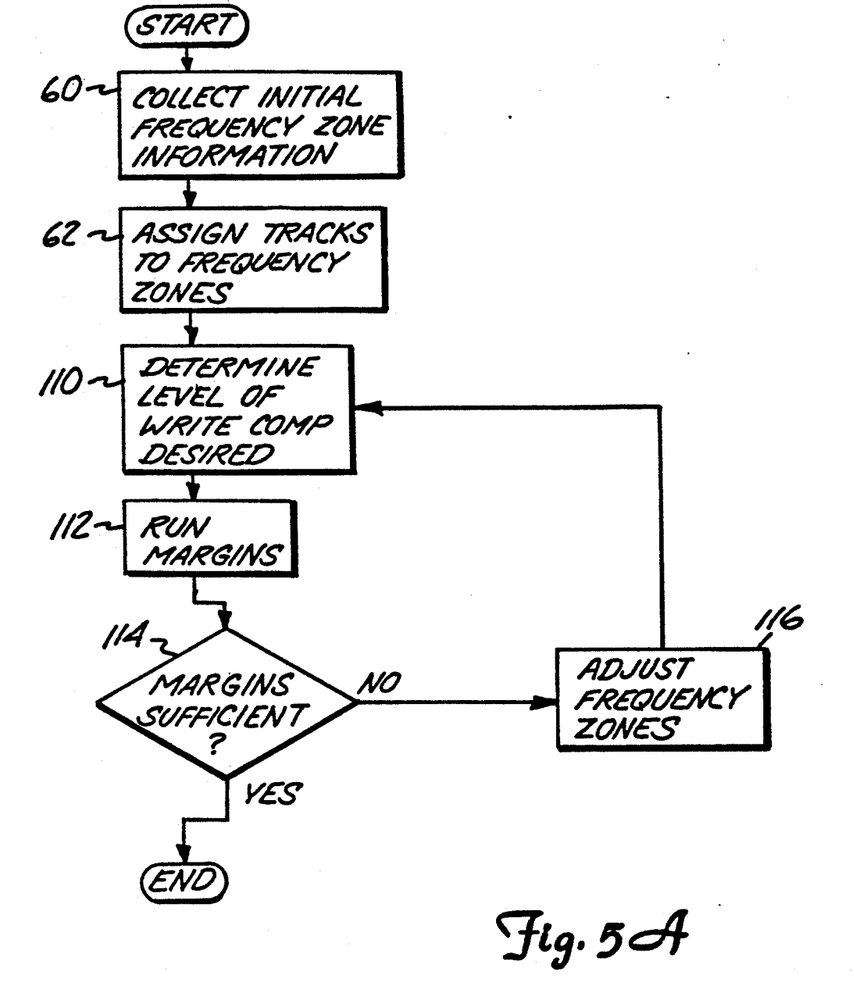
FIG. 5A is a flow diagram of a method for establishing frequency zones in accordance with the present invention.

FIG. 5 is a flow diagram illustrating the method of assigning tracks to frequency zones in accordance with the present invention. First, initial frequency zone information is collected by programmed controller 46 and host computer 44. Based on that information, the concentric tracks on the magnetic storage disc are preliminarily assigned to one of a plurality of frequency zones on the magnetic disc Each of the frequency zones corresponds to a zone frequency at which data is recorded on and read from the magnetic disc. This is illustrated by blocks 60 and 62 in FIG. 5 and is described in greater detail in section III B1.

After the preliminary assignment of the tracks to the frequency zones is made, host computer 44 and programmed controller 46 determine the level of write compensation which is desired Host computer 44 measures the value of the peak shift in the read signal of data bits written on the surface of the magnetic storage disc. Based on that peak shift value, the amount of write compensation desired for writing the data to the disc is determined. This is indicated by block 110 in FIG. 5A.

Once the amount of write compensation is determined, host computer 44 analyzes the performance of the disc drive to determine whether the window margins for data written to the surface of the magnetic storage disc, using the desired write compensation determined and using the preliminary track-to-zone assignments, meet a threshold margin level. This operation of checking the window margins (or "running margins") is described in greater detail in section III B 2.

The performance of the disc drive can be evaluated by determining a raw error rate for the data bits written to and subsequently read from the disc. The resolution method described in Bremmer et al can also be used. If the error rate is low enough (or where Bremmer is used, if the resolution is high enough) then the window margins are sufficient as indicated by block 114 and the program terminates. If the window margins are insufficient, the frequency zones are adjusted by reassigning borderline tracks on the magnetic disc to the adjacent lower frequency zone. This is indicated by block 116. Then, the desired level of write compensation is again determined in block 110 and window margins are as described with reference to block 112. This loop is repeated until the window margins are sufficient and the program terminates.

B. Detailed Operation

1. Preliminary Track Assignment a. Preliminary Assignments Using Resolution

The manner in which the frequency zone information is collected and the preliminary assignment of tracks to frequency zones is made can be any number of known methods. For example, the initial assignment of tracks to frequency zones can be made in accordance with the invention described in the Bremmer et al reference. In that case, a magnetic characteristic of the disc-to-head interface in disc drive 42 is measured at several locations on the disc. The Bremmer et al reference uses, as the magnetic characteristic, the pulse width at 50% amplitude (the PW50) of isolated pulses which are recorded on the magnetic disc surface. The frequency for writing and reading the data on the disc surface is then optimized on a track-by-track basis in terms of required resolution and the measurement of the magnetic characteristic (the PW50). Then, the read and write modes for the disc drive are adjusted to operate based on the optimized frequency at which data is written to and read from the magnetic storage disc on each track.

b. Preliminary Assignment Using Error Rate

Another method of making the initial assignment of data tracks to frequency zones shown in blocks 60 and 62 of FIG. 5 is set out in the Dahandeh et al U.S. patent application. In that method, the error checking capabilities of host computer 44 and programmed controller 46 are used to derive an error indication parameter. The error indication parameter is defined as the ratio of the number of data bit groups read from the magnetic disc that contain at least one error to the total number of data bit groups read from the magnetic storage disc. The error indication parameter derived for each frequency is compared to a nominal error indication parameter. The error indication parameter is derived for the data when written at different frequencies. Based on the comparison, tracks are assigned to frequency zones.

Host computer 48 is programmed to repeatedly generate random data bit groups that are transmitted to disc drive 42. Host computer 44 also generates commands that cause the data bit groups to be written on a selected track at a selected frequency while simultaneously storing each data bit group in internal memory of host computer 44. Immediately following the writing of the data bit groups to the magnetic disc in disc drive 42, host computer 44 transmits commands to disc drive 42 that cause each data bit group to be read immediately following writing so that a bit-by-bit comparison of the written and read groups can be performed in host computer 44. Host computer 44 then counts the number of data bit groups for which an error has been made in either the writing or reading operation. That number is then stored in host computer 44 for subsequent determination and retrieval of the error indication parameter.

Once the error indication parameters are determined for each selected track (i.e, once the ratio is determined between the number of data bit groups containing an error to the total number of data bit groups), track-to-zone assignments are made based on the values of the error indication parameters. Track assignments are made so that the error indication parameter for any given track does not exceed a threshold value.

Figure 5B:
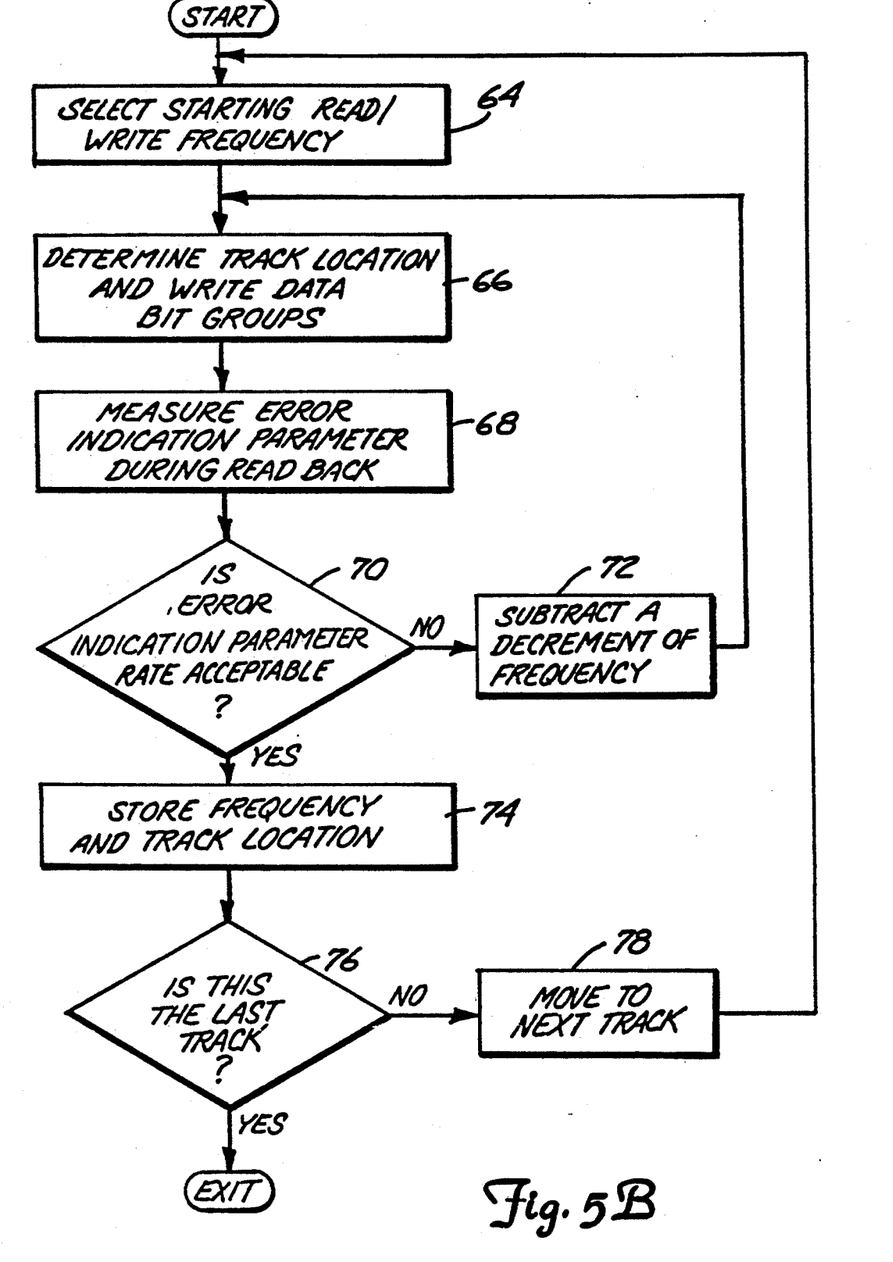
FIG. 5B is a flow diagram illustrating one embodiment of preliminarily assigning tracks to a frequency zone.

FIG. 5B is a flow diagram for programming host computer 44 to make the preliminary track-to-zone assignments for all tracks on the magnetic storage disc. Host computer 44 is programmed to start with a first track at one edge of the magnetic disc (either the outermost or innermost track) and to assign that track to a frequency zone and proceed from track to track until all tracks have been assigned to frequency zones. Host computer 44 begins by selecting a starting read/write frequency. This is shown in block 64. In this preferred embodiment, that frequency is the highest of the zone frequencies to which the tracks are to be assigned.

Once a frequency has been selected, the first track is located, as shown in block 66,, and the value of a selected error indication parameter is determined as described above. That error indication parameter value is then compared to the threshold value in block 70 to determine whether the error indication parameter rate is acceptable. Should the measured value be unacceptable, host computer 44 proceeds to the next lower frequency, indicated by block 72, and returns to the track location step of block 64. Host computer 44 continues cycling through these blocks until a frequency is found which results in an acceptable value for the error indication parameter.

Once such a frequency is determined, both the track location and the frequency are stored in memory in host computer 44 as indicated by block 74. Thus, blocks 66, 68, 70, 72 and 74 form a loop which locates a pair of frequencies, one of which corresponds to an error indication parameter that is above a preselected threshold value and the other of which corresponds to an error indication parameter having a value which is below the preselected threshold value. The zone to which the track is assigned corresponds to the lower of this pair of frequencies.

Following storage of each track assignment, host computer 44 determines whether all the tracks have been assigned to a frequency zone. This is shown in block 76. If not, host computer 44 moves to the next track and returns to the start of the program. This is indicated by block 78. Once all of the tracks have been assigned, the program terminates.

c. Preliminary Assignment Using Sampling

Figure 5C:
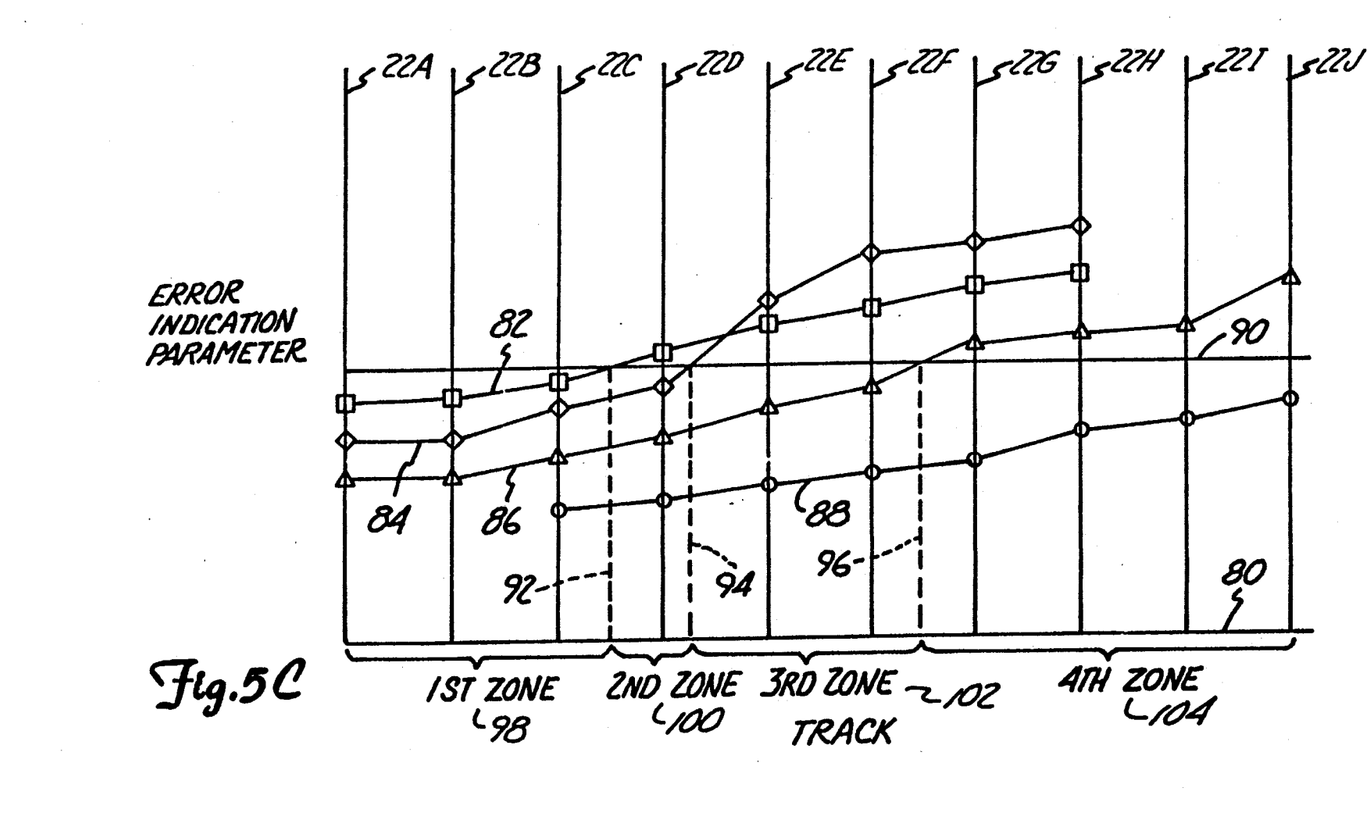
FIG. 5C is a graph illustrating the assignment of tracks to a frequency zone.

FIG. 5C illustrates another technique for preliminarily assigning the tracks to the frequency zones on the basis of an error indication parameter. In the technique illustrated by FIG. 5C, only a sampling of the tracks are used. For purposes of clarity, FIG. 5C has been drawn consistently with FIG. 1A in that each of the tracks 22A-22J is represented as a vertical line extending from track axis 80 and labeled with the track indication numeral shown in FIG. 1A. In addition, for the sake of clarity, FIG. 5C has been drawn for the case in which the disc 12 is divided into four frequency zones. Either more or fewer zones could be used in order to increase the capacity of the disc to store data.

In this second technique, the error indication parameter is measured for each of the selected tracks at each of the four frequencies corresponding to the four frequency zones. However, frequencies are excluded which result in an error indication parameter which is too large or too small relative to the threshold error indication parameter. The measured error indication parameters are presented graphically as a series of curves 82-88 on the error indication parameter versus track plot of FIG. 5C. Curves 82-88 correspond to the four zone frequencies in order from the highest of these frequencies to the lowest.

To assign the tracks to zones, each of the selected tracks for which an error indication parameter measurement has been made is assigned to the highest frequency zone for which the measured parameter does not exceed the threshold level. In FIG. 5C, the threshold level is indicated by line 90. Thus, tracks 22A, 22B and 22C are assigned to the highest of the frequencies for which FIG. 5C has been drawn (i.e., the frequency associated with curve 82). Similarly, track 22D is assigned to the frequency corresponding to curve 84; tracks 22E and 22F are assigned to the frequency corresponding to curve 86; and tracks 22G-22J are assigned to the frequency corresponding to curve 88.

Non-selected tracks are then assigned relative to the selected track assignments. For example, non-selected tracks between two selected tracks that have been assigned to the same frequency zone are similarly assigned to that zone. Thus, for example, all tracks between 22A and 22C will be assigned to the frequency zone to which those tracks are assigned.

Non-selected tracks that are between two selected tracks that were assigned to different frequency zones are then assigned by interpolation as indicated in FIG. 5C. The interpolation is carried out to determine circular tracks 92, 94, and 96 along the surface of the magnetic disc for which the error indication parameter would be substantially equal to the preselected threshold value. All tracks between a circular path 92, 94 or 96 and a selected track are then assigned to the same frequency zone as the frequency zone to which the selected track is assigned.

The result is a zone map substantially shown in FIG. 5C where the tracks from track 20A to circular path 92 are assigned to the frequency zone 98 corresponding to frequency curve 82. Tracks from the circular path 92 to the circular path 94 are assigned to a frequency zone 100 corresponding to frequency curve 84. Tracks from the circular path 94 to the circular path 96 are assigned to a frequency zone 102 corresponding to frequency curve 86, and the remaining tracks are assigned to zone 104 corresponding to frequency curve 88. Once the zones have been determined, the track assignments are stored in the programmed controller 46 as taught by Bremmer et al.

2. Determining Window Margins

Window margins can be determined using a variety of methods. For purposes of this disclosure, three methods are described by way of example.

a. Noise Injection

In the first example, noise is introduced into the data storage system by means of amplitude being injected into either the write signal or the read signal. By injecting amplitude, a peak shift is introduced into the data stream. The value of the amplitude introduced into the read or write signal is preferably substantially equal to the threshold noise margin. Then, performance of the disc drive is evaluated. In other words, host computer 44 determines whether the disc drive performs adequately (with an acceptably low error rate) using the data written to or read from the disc which includes the injected noise. The performance of the disc drive can be evaluated by determining a raw error rate, by using the error ratio described with reference to the Dahandeh et al application, by determining resolution as in Bremmer et al or by another suitable evaluation technique.

b. Window Marginalization

Figure 6:
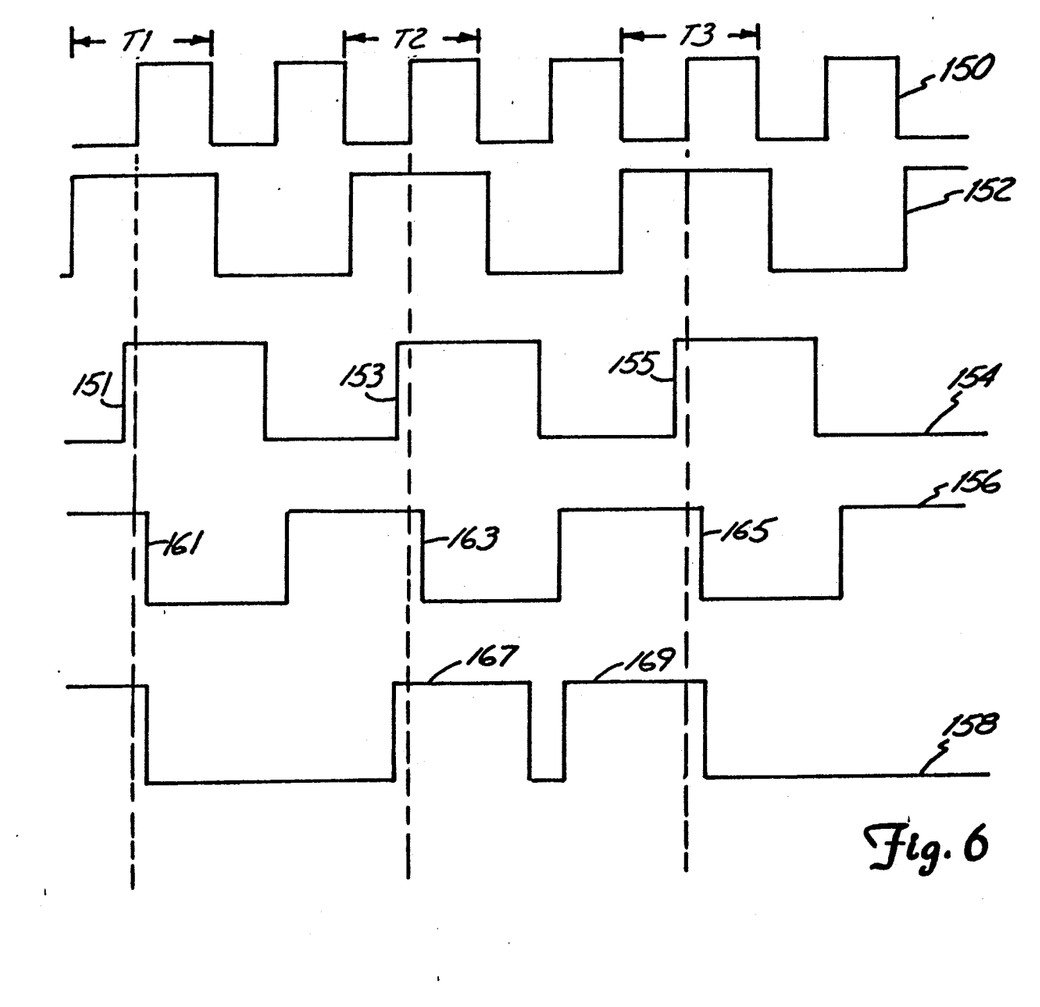
FIG. 6 is a timing diagram showing waveforms used in accordance with the present invention.

In a second embodiment, the window margins are determined using a method known as window marginalization. This is illustrated in FIG. 6. Waveform 150 represents a clock used in writing and retrieving data in the read and write control circuitry 50 and 48 in disc drive 42. In this embodiment, the read control circuit 50 is triggered by the rising edge of clock 150. Therefore, the read windows are designated by the time periods T1, T2 and T3 shown in FIG. 6 for three consecutive data pulses. Waveform 152 represents a digitized read signal Ideally, the pulses in read signal 152 should be centered around the rising edge of clock 150 in read windows T1, T2 and T3.

In order to test window margins using window marginalization, data read back from the surface of the magnetic disc is time shifted relative to the read windows. One form of time shifting the data read back from the disc is illustrated by waveform 154. The data pulses in waveform 154 are time shifted later in time relative to the read windows so that the valid data pulses have edges 151, 153 and 155 which are closer to the rising edge of clock 150 in read windows T1, T2 and T3. The amount which the data is shifted can vary but should preferably be adequate to test the window margins of the data being read.

After the data is read back and time shifted, and an error indication parameter is determined to test the window margins The error indication parameter, again, can be any suitable parameter, such as a raw error rate, the ratio described with reference to the Dahandeh et al application or the resolution described in the Bremmer et al patent. The error indication parameter is then used for testing the window margins.

Waveform 156 shows another window marginalization technique Waveform 156 is substantially the same as waveform 154 except it is time shifted so that the data is earlier in time. Thus, the leading edge of the data pulses 161, 163 and 165 are located near the rising edge of clock signal 150 in the read windows T1, T2 and T3. An error indication parameter is determined and window margins are tested. In one preferred embodiment, the window marginalization techniques illustrated by waveforms 154 and 156 are used together to test window margins.

Waveform 158 in FIG. 6 shows a third embodiment of window marginalization for the purpose of testing window margins In waveform 158, adjacent data pulses 167 and 169 in the read signal are alternately shifted earlier and later in time so that their trailing and leading edges, respectively, are closer to the rising edge of clock signal 150 in the read windows T1, T2 and T3.

The window marginalization techniques represented by waveforms 154, 156 and 158 must accommodate certain problems encountered in the disc drive readback channel It is common in disc drive control circuits that a phase locked oscillator is used to lock on to the frequency used in recording data on the disc and synchronizing that frequency and the clocking signals used in the disc drive. The phase locked oscillator is then used in recovering data from the disc. The effect of the phase locked oscillator is to average out certain inadvertent frequency shifts in the data read back from the disc. Thus, where data bits are slightly time shifted from the ideal time location, both in forward and reverse time directions, the phase locked oscillator averages out such inadvertent time shifts in the data recovery process. Therefore, where waveforms 154 and 156 are used to check margins in the data storage system, circuitry, such as a delay line, must be added to the readback channel in the disc drive so the data read from the disc is presented to the phase locked oscillator in an unshifted manner to recover the clock pulse, while it is also provied as time shifted data so the marginalization techniques can be performed. This can be done by providing the data read from the disc to both the PLO and to the delay line at the same time.

Similarly, where waveform 158 is used in checking margins, circuitry must be added so the data represented by the adjacent data pulses is shifted alternately forward and reverse in time by roughly the same amount of time. In this embodiment, the phase locked oscillator effectively averages out the time shifts so the time shifted data can be presented directly to the PLO and the clock can be recovered from that data.

The window marginalization described in this section can be accomplished by either shifting the data a known amount of time, for example, 0.5–2.0 nanoseconds, or by shifting the data by a desired percent of the read window. The same effective shift may be accomplished by shifting clock signal 150. In one preferred embodiment, the maximum time shift in implementing the window marginalization technique is 60% of half the read window. Each particular amount of time shift is expected to produce a particular error rate (or an error indication parameter corresponding to a particular error rate or a resolution associated with a specific error rate) which illustrates that the window margins are adequate. Thus, the measured error rate (or error indication parameter or resolution) can be compared to the expected value. Based on the comparison, the adequacy of the window margins is determined.

IV. CONCLUSION

In short, preliminary assignments are made assigning tracks to one of a plurality of frequency zones on a magnetic disc. Those assignments are made to achieve a desired error rate in the data storage system. The error rate is measured in a variety of ways including a raw error rate, an error indication parameter, or a resolution which corresponds to a given error rate. Once the desired error rate is achieved, pre-compensation is added and the system is checked to determine whether the window margins are adequate for the given preliminary track assignments. If the window margins are not adequate, the track assignments to the frequency zones are adjusted and pre-compensation is then readjusted. The frequency zone assignments and pre-compensation are continuously adjusted until a desired threshold window margin is reached. This provides for increased data density on a magnetic storage disc.

Although the present invention has been described with reference to preferred embodiments, workers skilled in the art will recognize that changes may be made in form and detail without departing from the spirit and scope of the invention.

What is claimed is:

1. In a data storage system of the type having a rotatable magnetic disc with a plurality of concentric tracks on the disc, and means for writing data to the tracks and reading data from the tracks at various frequencies, the means for writing data to the tracks including pre-compensating means for shifting data pulses without changing read windows during which data is read from the tracks to compensate for peak shifts, a method of assigning the tracks to frequency zones, the method comprising:

preliminary assigning each track to one of a plurality of frequency zones wherein each of the plurality of frequency zones corresponds to a zone frequency at which data is written to the tracks and read from the tracks;

writing data to the tracks;

adjusting the pre-compensating means, without changing the read windows, based on the peak shifts in the data written to the tracks at the corresponding zone frequency;

determining whether window margins for the data written to the tracks meet a threshold window margin; and adjusting the assignment of the tracks to the frequency zones and repeating the step of adjusting the means for pre-compensating if the window margins do not meet the threshold window margin.

2. The method of claim 1 wherein the step of preliminary assigning each track to one of a plurality of frequency zones comprises:

writing a train of data pulses to the tracks at a first frequency;

writing a train of pulses to the tracks at a second frequency;

determining amplitude for the train of data pulses written to the tracks at the first frequency;

determining amplitude for the train of pulses written to the tracks at the second frequency;

dividing the value of the amplitude determined for the train of pulses written at the first frequency by the amplitude determined for the train of pulses written at the second frequency to get a calculated resolution;

comparing the calculated resolution to a desired resolution having a known associated error rate to determine if the calculated resolution is within a desired range of the desired resolution; and assigning the tracks to the frequency zones based on the comparison.

3. The method of claim 1 wherein the step of preliminarily assigning each track to one of a plurality of frequency zones comprises:

writing data to the tracks at a plurality of zone frequencies;

reading data written from the tracks;

comparing the data read from the tracks to the data written to the tracks to determine an error indication parameter representing an error rate in writing data to the tracks and subsequently reading data from the tracks; and assigning the tracks to one of the plurality of frequency zones based on the error indication parameter.

4. The method of claim 1 wherein the step of determining whether window margins for the data written to the tracks meet a threshold noise margin comprises:

injecting noise, at a noise level substantially equal to the threshold noise margin, in the data storage system; and measuring an error parameter indicative of an error rate in writing and subsequently reading data on the disc for each of the plurality of tracks to determine whether the error parameter exceeds a threshold error level.

5. The method of claim 4 wherein the step of measuring an error parameter comprises:
reading the data written to the tracks; and
comparing the data read from the tracks to the data written to the tracks to determine a raw error rate in writing data to the tracks and subsequently reading data from the tracks.

6. The method of claim 4 wherein the step of writing data to the tracks comprises
writing a train of data pulses to the tracks at a first frequency; and
writing a train of data pulses to the tracks at a second frequency 7. The method of claim 6 wherein the step of measuring an error parameter comprises:
determining amplitude for the train of data pulses written to the tracks at the first frequency;
determining amplitude for the train of pulses written to the tracks at the second frequency;
dividing the value of the amplitude determined for the train of pulses written at the first frequency by the value of the amplitude determined for the train of pulses written at the second frequency to get a calculated resolution; and
comparing the calculated resolution to a desired resolution having a known associated error rate to determine if the calculated resolution is within a desired range of the desired resolution.

8. The method of claim 4 wherein the step of injecting noise comprises:
injecting noise in a read signal representing the data written to the tracks and generated by the means for reading the data from the tracks.

9. The method of claim 1 wherein the step of writing data to the tracks comprises:
providing a write signal in the form of data pulses representative of data to be written to the tracks.

10. The method of claim 9 wherein the data is read back during read windows, and wherein the step of determining whether window margins for the data written to the tracks meet a threshold window margin comprises:
time shifting the data pulses by a predetermined amount of time when reading the data from previously recorded tracks;
determining an error rate parameter indicative of errors in the storage system; and
comparing the error rate parameter with a threshold error level to determine whether the error rate parameter exceeds the threshold error level.

11. The method of claim 10 wherein the step of determining an error rate parameter comprises
comparing the time shifted data pulses to data written to the tracks to determine a raw error rate.

12. The method of claim 10 wherein the step of determining an error rate parameter comprises:
determining amplitude for a train of data pulses written to the tracks at a first frequency;
determining amplitude for a train of pulses written to the tracks at a second frequency;
dividing the value of the amplitude determined for the train of pulses written at the first frequency by the value of the amplitude determined for the train of pulses written at the second frequency to get a calculated resolution; and
comparing the calculated resolution to a desired resolution having a known associated error rate to determine if the calculated resolution is within a desired range of the desired resolution.

13. The method of claim 10 wherein the step of time shifting the pulses comprises:
time shifting the pulses by a desired time period relative to the read windows.

14. A method of assigning concentric tracks on a magnetic disc in a data storage system to a frequency zone in which data is written to the tracks and read from the tracks at a zone frequency corresponding to the frequency zone, the method comprising:
assigning tracks on the magnetic disc to one of a plurality of frequency zones wherein each frequency zone has a corresponding zone frequency;
determining a write compensation value to be used in shifting data pulses of data written to the tracks without changing read windows during which data is read from the tracks to compensate for peak shifts in the data written to the tracks;
determining whether window margins for data written to the tracks using the write compensation value meet a threshold window margin; and
if the window margins do not meet the threshold window margin, adjusting the assignment of the tracks to the frequency zones and repeating the steps of determining a write compensation value and determining whether window margins for data written to the tracks using the write compensation value meet a threshold window margin.

15. The method of claim 14 wherein the step of determining a write compensation value comprises:
measuring peak shift in data written to the track at the zone frequency; and
determining a compensation time period to compensate for the peak shift.

16. The method of claim 14 wherein the step of determining whether window margins meet a threshold window margin comprises:
injecting noise into data read back from the magnetic disc;
measuring an error parameter indicative of an error rate in writing and subsequently reading the data from the track; and
comparing the error parameter to a desired error parameter to determine whether the error parameter is within a desired range of the desired error parameter.

17. The method of claim 14 wherein data is recorded on the tracks on the magnetic disc in the form of pulses representative of data stored on the disc, wherein the data is valid during read windows when the data is read back from the magnetic disc, and wherein the step of determining whether window margins for the data written to the tracks meet a threshold window margin comprises:
time shifting the data pulses read back from on the magnetic disc relative to the read windows;
measuring an error parameter indicative of an error rate in writing and subsequently reading the data from the track; and
comparing the error parameter to a desired error parameter to determine whether the error parameter is within a desired range of the desired error parameter.

18. The method of claim 17 wherein the step of time shifting comprises:
time shifting adjacent data pulses read back from the magnetic disc in opposite directions relative to the read windows.

19. The method of claim 17 wherein the step of time shifting comprises:
time shifting the data pulses read back from the magnetic disc by a time period determined as a percentage of the read window.

* * * * *

UNITED STATES PATENT AND TRADEMARK OFFICE
CERTIFICATE OF CORRECTION

PATENT NO. : 5,258,876

DATED : November 2, 1993

INVENTOR(S) : GINA R. DANNER, EVGENY J. BERZON

It is certified that error appears in the above-identified patent and that said Letters Patent is hereby corrected as shown below:

On the Title Page of the Patent, in the References Cited, item [56] under U.S. PATENT DOCUMENTS, insert the following:

| | | |
|---|---|---|
| 4,202,017 | 5/1980 | Geffon et al.......360/45 |
| 5,107,378 | 4/1992 | Cronch et al.......360/45 |

Signed and Sealed this

Fifth Day of April, 1994

*Attest:*

BRUCE LEHMAN

*Attesting Officer*     *Commissioner of Patents and Trademarks*